Figure 1:
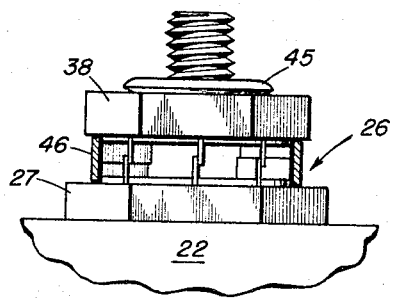

Oct. 25, 1966  N. N. RUBIN  3,280,689

TORQUE LIMITING NUT

Original Filed Feb. 28, 1964

INVENTOR
*Norman N. Rubin*

BY  *Claude Funkhouser*
ATTORNEY

United States Patent Office 3,280,689
Patented Oct. 25, 1966

3,280,689
TORQUE LIMITING NUT
Norman N. Rubin, 10012 Portland Place,
Silver Spring, Md.
Original application Feb. 28, 1964, Ser. No. 348,917.
Divided and this application Sept. 20, 1965, Ser. No. 488,824
5 Claims. (Cl. 85—61)

The invention described herein may be manufactured and used by or for the Government of the United States of America for governmental purposes without the payment of any royalties thereon or therefor.

This invention which is a division of Ser. No. 348,917 filed Feb. 28, 1964, relates to separable fasteners of the bolt and nut type, and more particularly to a nut designed to have relative linear motion, with a bolt, effected by rotary motion ineffective to produce relative linear motion, upon a predetermined resistance to torque being established.

There are instances where a nut and bolt are used where overtightening of the nut is detrimental to the job to which the separable fastener is applied. An extra turn can weaken the threads and sometimes the entire strain of the fastening is on a single thread which when subjected to an overstrain can rupture and render the fastener useless. There are instances where, due to the nature of the material, such as glass or ceramic material of a fragile nature, the nut should not be tightened after a predetermined resistance is reached. Any further torque will rupture the material and any lesser torque will not insure a complete fastening. While it is true there are wrenches where the torque is measured, any force beyond this measurement results in a non-turning of the nut. However, it is believed that this does not solve the problem as it is notorious that although tools are made to do a particular job, the mechanic will use the tool at hand and the advantages of designing a tool for a particular purpose is wasted. With the design of a nut which could not be tightened beyond a desired resistance to turning the hazard of overtightening could be avoided.

It is an object of the present invention to provide a separable fastener of the nut and bolt type which has relative linear movement between the nut and the bolt upon the application of rotary motion to the nut, which upon a predetermined resistance to turning being reached, further torque applied to the nut will be ineffective to produce further relative linear motion between the nut and bolt.

It is another object of the present invention to provide a separable fastener such as a nut and bolt where the nut is designed so that it may not be overtightened, and that upon a predetermined resistance to turning being reached, any further torque applied will be ineffective to produce any linear movement of the nut relative to the bolt.

It is another object of the present invention to provide a structure which is built into the fastener itself which prevents overtightening.

It is another object of the present invention to provide friction drive means within the body structure of the nut which upon reaching a predetermined load will slip permitting continued turning of the nut without advancement of the nut on the bolt.

It is a further object of the present invention to provide a nut having two separable portions, one of the portions engaging the threads of the bolt and the other of said portions being engaged by a wrench and turning the first portion through some disengageable drive.

It is a further object of the present invention to provide means within the body structure of the nut to permit rotation of the nut without linear movement of the nut relative to the bolt.

It is a further object of the present invention to provide a nut formed with an elongated body made of separated longitudinal segments and to thread a portion of the interior of these segments and to engage the nut with means to spread the segments to prevent cooperation of the threads of the bolt with those of the nut.

It is a further object of the present invenion to provide a separable fastener having a bolt and a nut with the nut being of two parts, one of the parts engaging the threads of the bolt and the other of said parts being used to turn the bolt engaging nut with a disengaging drive means between the two sections of the nut so that when a predetermined resistance to turning is reached one of the sections of the nut may be rotated without imparting rotation to the other section.

A still further object of the present invention is to provide resilient fins on that portion of the nut which is threaded onto the bolt, and to also provide similar resilient fins on that portion of the nut which is turned by the wrench and to engage these fins so that the turning of the upper portion of the nut results in the turning of the lower portion of the nut until a predetermined torque is reached, at which point the fins will flex and pass each other without transmitting any rotary motion.

It is a still further object of the present invention to provide structure within the body of the nut wherein the fins which engage each other to produce transmittal of rotary motion may be of different material from that of the nut so that materials of different stiffness may be used thereby making nuts which could be tightened to a greater or lesser torque.

Figure 2:
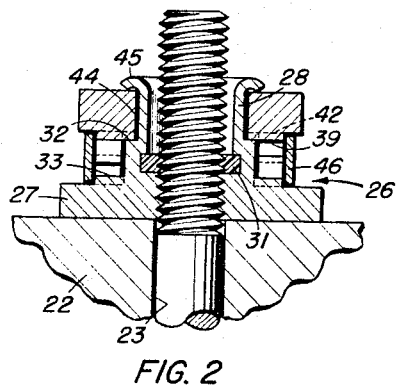
Figure 4:
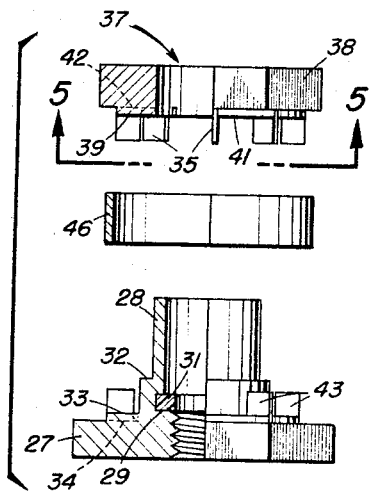
Figure 3:
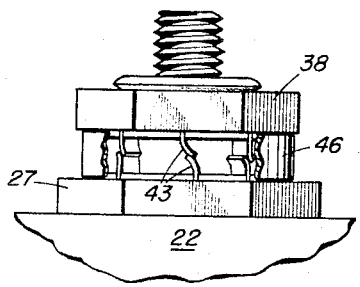
Figure 5:
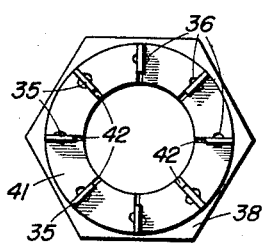

Other objects, advantages and novel features of the invention will become apparent from the following detailed description of the invention when considered in conjunction with the acompanying drawings wherein:

FIG. 1 is a front elevation of the separable fastener;
FIG. 2 is a vertical cross-section of the same;
FIG. 3 is a front elevation of a portion of the fastener with parts broken away to illustrate a detail;
FIG. 4 is a vertical cross-section showing the parts separated;
FIG. 5 is a bottom plan view taken on line 5—5 of FIG. 4.

Referring to the drawing wherein like parts have similar numbers throughout the several figures the invention is specifically illustrated in FIGURES 1–5.

Some structure 22 designed to be secured by a fastener has a hole 23 through which a bolt 24 is passed. The bolt receives a nut 26 formed with a hexagon head 27 and an elongated cylindrical body portion 28 having a longitudinal bore. Adjacent the head, the body portion 28 is formed with an interior annular recess 29 in which a washer 31 is seated. This washer has an interior diameter slightly less than the interior diameter of the bore to provide a sealing contact with threads of the bolt.

The body portion 28 is further formed with an exterior shoulder 32 and is threaded on its interior surface adjacent the hexagon head. The inner surface 33 of the hexagon head 27 has a plurality of radial slots 34 receiving and supporting a plurality of resilient fins 35 which are staked at 36 to the nut. These fins project above the inner surface of the hexagon head and are formed of flexible steel or some similar material.

A rotary member 37 having a hexagon head 38 and an inner rim or flange 39 is also formed on its inner face 41 with a plurality of radial slots 42 which support fins 43 of similar form and material as the fins 35. The fins 43 and 35 are opposed to each other and are of a length to engage each other upon relative rotary motion of the nut and the rotary member. The rotary member rests on the shoulder 32 and turns upon the bearing surface 44 of the cylindrical body portion 28 and is securely held in position by the overturned end 45 of the cylindrical portion 28 and the contact of the rim 39 with the exterior annular shoulder 32.

Rotary motion of the rotary member is transferred to the nut through the engagement of the fins of the rotary member with the fins of the nut. This overlap of the fins is slight, in the nature of a few thousandths of an inch, so that upon a specified resistance to turning of the nut 26 the fins will flex and pass each other so that further rotary motion of the rotary member 37 will be ineffective to rotate the nut and will not produce relative linear motion of the nut and bolt.

The inner surface of the hexagon head of the rotary member 37 and the inner surface of the hexagon head of the nut 26 are engaged by opposite ends of a sleeve 46 which encircles the fins and provides bearing surface at the outside of the turning member and the nut. The sleeve 46 also serves as a protective member shielding the fins from dirt.

When a torque is applied to the head of the rotary member, this torque is transferred through the fins to the nut, which, through the threads of the nut and bolt, advances on the bolt until the resistance to turning reaches a predetermined amount. Any application of a greater torque simply results in the rotary member turning freely, the fins flexing and passing over one another without any transfer of rotary motion.

The fins may be varied in thickness and strength of material as well as the in number of fins utilized. The nut will function with any number of fins from one to as many as could be arranged in working order.

Obviously many modifications and variations of the present invention are possible in the light of the above teachings. It is therefore to be understood that within the scope of the appended claims the invention may be practiced otherwise than as specifically described.

What is claimed is:

1. A separable fastener comprising:
   a threaded bolt;
   a nut formed with a non-circular base portion and an elongated, substantially cylindrical body portion;
   said nut being interiorly threaded in the base portion and formed with an annular interior recess adjacent the threaded portion;
   the exterior of the nut between the head portion and the cylindrical portion being formed with a pair of axially spaced annular shoulders with the shoulder closer to the nut base extending radially outwardly beyond the other of said shoulders;
   a plurality of resilient, axially directed fins extending from said shoulder closer to said base and being rigidly secured thereto, said fins defining relatively thin, flat elements lying in substantially radial planes with respect to the longitudinal axis of the nut;
   a rotary member rotatably journaled on the cylindrical body portion of said nut and abutting the other of said shoulders, said rotary member having a non-circular external surface and having a plurality of resilient fins substantially identical to those on said nut extending axially from the underside thereof toward the fins on said nut and being rigidly secured thereto;
   the free ends of the fins on said rotary member extending axially beyond the free ends of the fins on said nut;
   whereby rotary motion of the rotary member will impart rotary motion to said nut through said opposed fins and result in relative linear movement between said bolt and said nut to a position where the resistance to rotary motion is sufficient to spring the fins of said rotary member over the fins of said nut so that continued rotary motion of said rotary member will not result in relative linear movement of said nut and bolt; said nut having radially outwardly extending means at the free end of said cylindrical portion for retaining said rotary member thereon.

2. A separable fastener according to claim 1 and including means for securing said fins in said slots in both the rotary member and the nut.

3. A separable fastener according to claim 1 wherein the radially outwardly extending means on said cylindrical body portion comprises an overturned retaining ring, integral with the base member.

4. A two-piece nut adapted to be threaded onto a bolt comprising:
   a threaded member formed with a base portion having a central threaded hole and an upstanding cylindrical bearing portion;
   a plurality of substantially rectangular shaped resilient fins, said fins being comparatively thin and arranged circumferentially on a plane passing through the axis of the nut, said fins being mounted on said base portion;
   a rotary member mounted for rotation on said bearing portion of the threaded member;
   resilient fins similar to said base fins mounted on the under side of said rotary member adapted to simultaneously engage the base fins of the threaded member and to impart rotation to said threaded member through the engagement of said rotary member fins of said threaded member, said fins yielding to a predetermined torque and passing over one another without imparting rotation to the threaded member; and
   means for supporting said rotary member a predetermined distance above said threaded member, said predetermined distance establishing the overlap of the fins of the rotary member with those of the threaded member.

5. A two piece nut according to claim 4 wherein the means for supporting the rotary member above the threaded member is a ring of predetermined height engaging both the threaded member and the rotary member and spacing them the one from the other.

References Cited by the Examiner

UNITED STATES PATENTS

| 2,410,971 | 11/1946 | Hartley | 81—52.4 |
| 2,503,189 | 4/1950 | Biba | 81—52.4 |
| 2,685,812 | 8/1954 | Dmitroff | 85—61 |
| 3,191,486 | 6/1965 | Gibbens | 85—61 |

FOREIGN PATENTS

| 108,532 | 8/1917 | Great Britain. |

CARL W. TOMLIN, *Primary Examiner.*

R. S. BRITTS, *Assistant Examiner.*